United States Patent
Baronian et al.

(10) Patent No.: US 9,948,211 B2
(45) Date of Patent: Apr. 17, 2018

(54) SYSTEM AND METHOD FOR CONTROLLING THE OPERATING AREA OF AN INVERTER COUPLED TO AN ALTERNATIVE ENERGY SOURCE

(71) Applicant: Eaton Corporation, Cleveland, OH (US)

(72) Inventors: Armen Baronian, Toronto (CA); Prasanna S. Nirantare, Pune (IN)

(73) Assignee: Eaton Corporation, Cleveland, OH (US)

( * ) Notice: Subject to any disclaimer, the term of this patent is extended or adjusted under 35 U.S.C. 154(b) by 184 days.

(21) Appl. No.: 15/002,556

(22) Filed: Jan. 21, 2016

(65) Prior Publication Data

US 2017/0214337 A1   Jul. 27, 2017

(51) Int. Cl.
  *H02J 1/00*  (2006.01)
  *H02M 7/539*  (2006.01)
  *H02J 3/38*  (2006.01)

(52) U.S. Cl.
  CPC ............ *H02M 7/539* (2013.01); *H02J 3/385* (2013.01)

(58) Field of Classification Search
  None
  See application file for complete search history.

(56) References Cited

U.S. PATENT DOCUMENTS

| | | | |
|---|---|---|---|
| 6,369,462 B1 * | 4/2002 | Siri | G05F 1/67 307/51 |
| 8,964,435 B2 | 2/2015 | Wagoner et al. | |
| 9,059,604 B2 | 6/2015 | Johnson | |
| 2010/0308585 A1 | 12/2010 | Jorgensen et al. | |
| 2011/0295437 A1 | 12/2011 | Lu et al. | |
| 2013/0018516 A1 | 1/2013 | Chee et al. | |
| 2013/0027997 A1 | 1/2013 | Tan et al. | |
| 2013/0250635 A1 | 9/2013 | Sivakumar et al. | |
| 2015/0188482 A1 * | 7/2015 | Berkowitz | H02J 3/383 320/101 |
| 2017/0201170 A1 * | 7/2017 | Abu-Hajar | H02M 1/12 |

* cited by examiner

*Primary Examiner* — Long Nguyen
(74) *Attorney, Agent, or Firm* — Ziolkowski Patent Solutions Group, SC (57) ABSTRACT

A system includes a controller programmed to control an inverter to supply a power grid with a maximum amount AC electrical power while operating within an operating area that is pre-defined based on hardware limitations of the inverter. The system allows the inverter to operate with a variable low-DC voltage input into the inverter as opposed to a preset threshold DC voltage, thereby maximizing the amount of power the inverter supplies to a power grid. The inverter controller operates by prioritizing the reactive power output by the inverter over the active power output by the inverter so that the inverter is able to generate an output that meets the reactive power command from a utility and supplies the maximum amount of active power.

20 Claims, 7 Drawing Sheets

SYSTEM AND METHOD FOR CONTROLLING THE OPERATING AREA OF AN INVERTER COUPLED TO AN ALTERNATIVE ENERGY SOURCE

BACKGROUND OF THE INVENTION

The present invention relates generally to inverter control systems and, more particularly, to a system and method for controlling an inverter to operate within a safe operating area while maximizing a power output from an alternative energy source such as, for example, a photovoltaic (PV) array, to a power grid.

Most homes and/or facilities with electrical systems receive alternating current (AC) electrical power from a utility power grid. Many facilities connected to utility power grids will substitute power from the power grids with power from their own alternative energy sources. The alternative energy sources may include solar, wind, geothermal, and/or hydroelectric energy sources, as non-limiting examples. In some cases, the alternative energy sources will generate power in excess of what the facilities need to operate the facilities' electrical systems. In those cases, the excess generated electrical power from the alternative energy sources can be supplied back into power grids in exchange for compensation.

Since power grids provide AC electrical power, only AC power can be supplied into power grids. Therefore, in the case of alternative energy sources that produce direct current (DC) power, an inverter must be used to invert the energy from the DC alternative energy sources from DC power to AC power. An inverter is operated by a controller that selectively controls switches of the inverter to invert the DC power into AC power. During operation, the inverter controller receives a reactive power command from a utility and a power grid voltage from the power grid to which the inverter supplies power. The controller then regulates switching within the inverter to supply that reactive power and voltage to the power grid.

These inverters are controlled to limit the input DC-side current and the output AC-side current so as not to damage the internal hardware of the inverter. The operation of an inverter is also restricted by the DC voltage of the alternative energy source. Typically, the controller for an alternative energy source inverter is designed to switch off the inverter if the DC voltage of the alternative energy source drops below a preset threshold DC voltage. Therefore, when the DC voltage of the alternative energy source drops below the threshold, no active or reactive power is supplied to the power grid. Further, the reactive power specified for an inverter is limited to a small percentage of the apparent power rating of the inverter (for example, an inverter may be restricted to providing a power factor of +/−0.91). All of the above limitations—the inverter DC and AC current limits, the reactive power command and the power grid voltage, the alternative energy source DC voltage, and the inverter power factor limits—impose restrictions on extracting the maximum amount of active power out of alternative energy sources.

The above limitations pose additional restrictions when the inverter is used for higher apparent power applications. Because an inverter has limited AC current capabilities, the AC voltage of the inverter must be increased to increase the apparent power rating of the inverter. However, the DC voltage supplied to the inverter from the alternative energy source remains the same. This increase in the AC voltage of the inverter makes the problem of low DC voltage more severe because the inverter must be disconnected from the alternative energy source at a higher DC voltage, further limiting the inverter from extracting active power from the alternative energy source and supplying the requested reactive power to the power grid.

In any case, a preset (static) threshold DC voltage limits an inverter from providing any power to a power grid when the DC voltage generated by the alternative energy source is below that threshold DC voltage. Therefore, even if the alternative energy source has a DC voltage output that could be used to provide power to the power grid, the inverter will be switched off if the DC voltage is below the threshold.

It would therefore be desirable to provide a system and method for controlling an inverter to operate within the hardware limitations of the inverter and the limitations of a power grid while maximizing the active power provided to the power grid from an alternative energy source under low-DC voltage conditions.

BRIEF DESCRIPTION OF THE INVENTION

Embodiments of the present invention provide a system and method for controlling an inverter to operate within its hardware limitations while maximizing the supply of active power from an alternative energy source to a power grid.

In accordance with one aspect of the invention, a system for controlling an inverter to supply power from a DC power source to a power grid includes a sensor system coupled to the power grid, a voltage sensor coupled to an output of the DC power source, and a controller coupled to the sensor system and the voltage sensor to receive signals therefrom. The controller is programmed to calculate a maximum reactive power that the inverter can deliver to the power grid according to a reactive power algorithm and based on a reactive power command received from a utility, a power grid voltage received from the sensor system, and a voltage of the DC power source received from the voltage sensor. The controller is also programmed to calculate a maximum active power that the inverter can deliver to the power grid according to an active power algorithm and based on the maximum reactive power. The controller is further programmed to control the inverter to deliver to the power grid the maximum reactive power and an active power equal to the smaller of the maximum active power and a maximum power point tracking active power command.

In accordance with another aspect of the invention, a method for controlling an inverter includes receiving a reactive power command from a utility and sensing a voltage of the power grid and a direct current (DC) voltage of a power source providing power to the power grid. The method also includes calculating in a reactive power algorithm a maximum reactive power the inverter can deliver to the power grid based on the reactive power command, the voltage of the power grid, and the DC voltage of the power source. The method further includes calculating in an active power algorithm a maximum active power the inverter can deliver to the power grid based on the reactive power the inverter can deliver to the power grid. In addition, the method includes outputting the maximum reactive power to an inverter current control block and outputting control signals from the inverter current control block to switches of the inverter to control the inverter to output to the power grid the maximum reactive power.

In accordance with yet another aspect of the invention, a photovoltaic (PV) system includes a PV array, an inverter coupled to the PV array for converting a direct current (DC) voltage of the PV array to an alternating current (AC)

voltage for delivery to a power grid, a power grid sensor system for monitoring a voltage of the power grid, and a PV sensor for monitoring the DC voltage of the PV array. The PV system also includes a controller programmed to calculate a maximum reactive power the inverter can deliver to the power grid based on a reactive power command received from a utility, the voltage of the power grid, the DC voltage of the PV array, and an AC-side current limit of the inverter. The controller is further programmed to calculate a maximum active power the inverter can deliver to the power grid based on the maximum Q-axis current and the AC-side current limit of the inverter. The controller is additionally programmed to control the inverter to output to the power grid the maximum reactive power and an active power equal to the lesser of the maximum active power and a maximum power point tracking active power command.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for controlling an inverter to supply a utility power grid with the maximum amount AC electrical power while operating within an operating area that is pre-defined based on hardware limitations of the inverter, namely the DC-side and AC-side current limits of the inverter. This pre-defined operating area is referred to hereafter as the safe operating area (SOA) of the inverter. Embodiments of the system and method disclosed herein differ from prior art systems by allowing the inverter to operate with a variable low-DC voltage input into the inverter instead of using a preset threshold DC voltage, thereby maximizing the amount of power the inverter supplies to a power grid. The inverter controller or control system operates by prioritizing the Q-axis current over the D-axis current so that the inverter is able to generate an output that meets the reactive power setting or command from a utility with the maximum amount of active power. While embodiments of the invention are described herein with reference to a PV system, those with skill in the art will understand that the concepts disclosed herein may be used with any energy source that generates DC power, including wind, hydro, battery-storage, and flywheel power systems as non-limiting examples.

Figure 1:
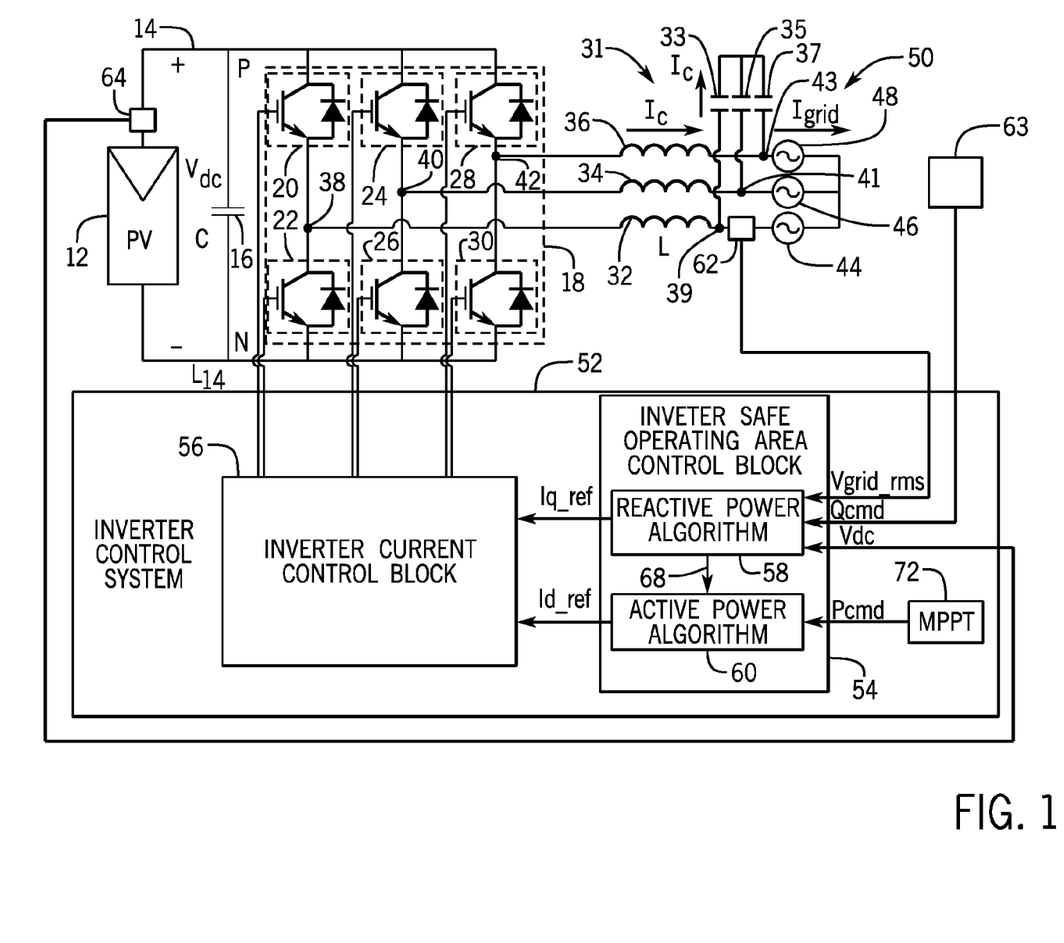
FIG. 1 is a schematic diagram of a photovoltaic (PV) system, according to an embodiment of the invention.

Referring to FIG. 1, a PV system 10 is illustrated, according to an embodiment of the invention. The PV system 10 includes a PV array 12 that supplies a DC voltage, $V_{dc}$, to a DC bus 14. In one embodiment, PV array 12 is composed of a plurality of PV strings (not shown) connected in parallel, with each of the PV strings including a plurality of modules (not shown) therein that are connected in series to generate a DC power from received solar radiation. While PV system 10 is shown having only one PV array 12, it is contemplated that the number of PV arrays in PV system 10 can vary, with two, three, four or more PV arrays 12 being included in PV system 10, for example, with each PV array 12 being configured to generate a DC power responsive to received solar radiation. Each PV array 12 is composed of a plurality of PV strings (not shown) connected in parallel, with each of the PV strings including a plurality of modules (not shown) therein that are connected in series to generate a DC power.

A capacitor bank 16 having a capacitance C and a three-phase inverter 18 are coupled to the DC bus 14 in parallel with the PV array 12. The capacitor bank 16 may include one or more capacitors. The inverter 18 includes switches or switching elements 20, 22, 24, 26, 28, 30 that are selectively controlled such that inverter 18 outputs a desired AC power to a utility power grid 50 (including individual phases 44, 46 and 48). Switches 20, 22, 24, 26, 28, 30 may be in the form of any of a number of various switching elements or devices, including a relay, an IGBT, an SCR, a circuit breaker, sub-arrays of small contactors, or other suitable switching devices. An LC filter 31 including filter inductors 32, 34, 36 and filter capacitors 33, 35, 37 is coupled to the inverter 18. The inductors 32, 34, 36 are coupled to nodes 38, 40, 42 between switches 20 and 24, 24 and 26, and 28 and 30, respectively, and each of the inductors 32, 34, 36 has the same or substantially the same inductance L. Each inductor 32, 34, 36 is coupled to a phase 44, 46, 48 of the utility power grid 50. The capacitors 33, 35, 37 are coupled in a Y-configuration to form a low-pass filter. According to various embodiments of the invention, PV system 10 may also include any number of additional components (not shown) such as, for example, filters, fuses, contactors, and/or circuit breakers coupled between the inverter 18 and the utility power grid 50.

The relationship between the current flowing through the inductors 32, 34, 36; the capacitors 33, 35, 37; and the power grid 50 is given by:

$$I_L = I_C + I_{grid} \quad [\text{Eqn. 1}],$$

where $I_L$ is the current output by the inverter 18 and flowing through the inductors 32, 34, 36; $I_C$ is the current flowing through the filter capacitors 33, 35, 37; and $I_{grid}$ is the current flowing into the power grid 50. The inverter current, $I_L$, splits into the filter capacitor current, $I_C$, and the power grid current, $I_{grid}$, at nodes 39, 41, 43. With reference to FIGS. 2-3 and 5-6, various forms of the inverter current, $I_L$, the filter capacitor current, $I_C$, and the power grid current, $I_{grid}$, are be labeled to as $I_{L\_x}$, $I_{C\_x}$, $I_{grid\_x}$, with "x" being replaced by the appropriate label.

The PV system 10 also includes an inverter controller or control system 52 for controlling the switches 20, 22, 24, 26, 28, 30 of the inverter 18. The controller 52 includes two control blocks: an inverter safe operating area (ISOA) control block 54 and an inverter current control block 56.

The ISOA control block 54 includes two algorithms: a reactive power algorithm 58 and an active power algorithm 60. The reactive power algorithm 58 receives three inputs: a power grid root mean square (rms) voltage, $V_{grid\_rms}$, of the power grid 50 measured at the output terminal of the inverter 18 by a sensor system 62, a reactive power command, $Q_{cmd}$, received from a utility 63, and the PV array DC voltage, $V_{dc}$, measured by a sensor 64. In various embodiments, the sensor system 62 includes a first sensor (not shown) for sensing the power grid rms voltage, $V_{grid\_rms}$, and a second sensor (not shown) for sensing the grid currents. While the reactive power command, $Q_{cmd}$, is received from the utility 63, a reactive power, Q, for delivery to the power grid 50 by the inverter 18 is calculated by the reactive power algorithm 58. The reactive power algorithm 58 uses the power grid rms voltage, $V_{grid\_rms}$, the power grid reactive power command, $Q_{cmd}$, and the PV array DC voltage, $V_{dc}$, to calculate an inverter Q-axis reference current, $I_{q\_ref}$, which the reactive power algorithm 58 outputs to the inverter current control block 56. The inverter Q-axis reference current, $I_{q\_ref}$, represents the maximum Q-axis current the inverter 18 can deliver to the power grid 50 while staying within the hardware limitations of the inverter 18 and meeting the constraints of the power grid rms voltage, $V_{grid\_rms}$, and the PV array DC voltage, $V_{dc}$.

The active power algorithm 60 receives from the reactive power algorithm 58 various inputs 68 that will be described further with respect to FIG. 2 below. The active power algorithm 60 uses inputs 68 to calculate an inverter D-axis reference current, $I_{d\_ref}$, which the active power algorithm 60 outputs to the inverter current control block 56. The inverter D-axis reference current, $I_{d\_ref}$, represents the maximum possible D-axis current the inverter 18 can deliver to the power grid 50 while staying within the hardware limitations of the inverter 18 and meeting the constraints of the power grid rms voltage, $V_{grid\_rms}$, and the PV array DC voltage, $V_{dc}$.

Controller 52 further includes a maximum power point tracking (MPPT) algorithm 72 that calculates an MPPT active power command, $P_{cmd}$, which the MPPT algorithm 72 outputs to the active power algorithm 60 for calculating the inverter D-axis reference current, $I_{d\_ref}$. The inverter current control block 56 receives the inverter Q-axis and D-axis reference currents, $I_{q\_ref}$, $I_{d\_ref}$, from reactive power and active power algorithms 58, 60 and selectively controls switches 20, 22, 24, 26, 28, 30 of the inverter 18 to supply the maximum possible Q-axis and D-axis currents the inverter 18 can deliver to the power grid 50 while staying within the hardware limitations of the inverter 18 and meeting the constraints of the power grid rms voltage, $V_{grid\_rms}$, and the PV array DC voltage, $V_{dc}$.

Figure 2:
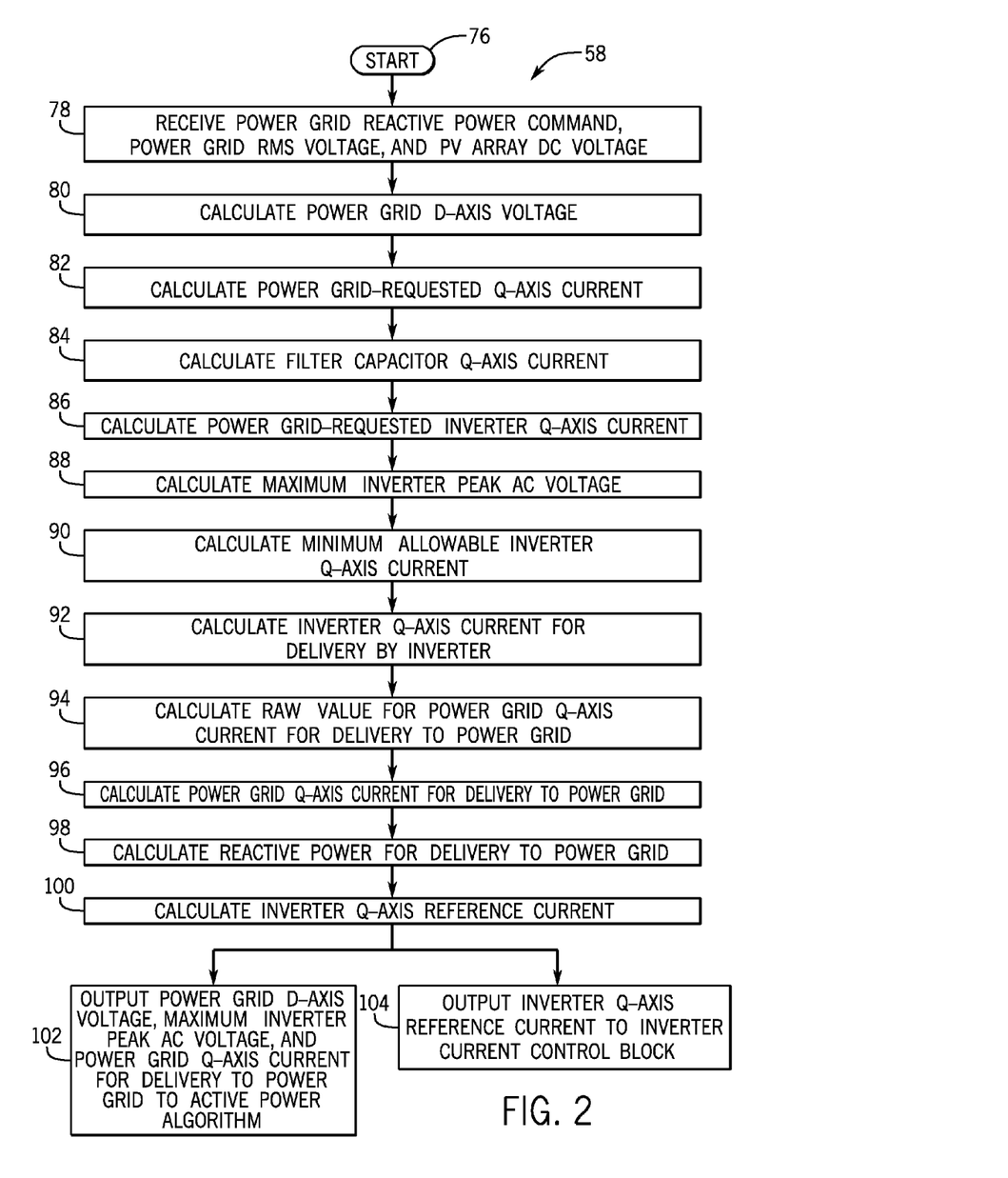
FIG. 2 is a flow chart setting forth exemplary steps of the reactive power algorithm of FIG. 1, according to an embodiment of the invention.

Referring now to FIG. 2, the reactive power algorithm 58 of FIG. 1 for calculating the inverter Q-axis reference current, $I_{q\_ref}$, is set forth, according to an embodiment of the invention. The reactive power algorithm 58 is based on defining an operating range of the inverter 18 based on a maximum voltage at the AC-side terminal of the inverter 18. The reactive power algorithm 58 starts at STEP 76 when the controller 52 is powered on. At STEP 78, the reactive power algorithm 58 receives the power grid rms voltage, $V_{grid\_rms}$ (FIG. 1), the power grid reactive power command, $Q_{cmd}$, and the PV array DC voltage, $V_{dc}$.

At STEP 80, the reactive power algorithm 58 calculates a power grid D-axis voltage, $V_{grid\_d}$, which is the D-axis voltage component of the power grid rms voltage, $V_{grid\_rms}$, of the power grid 50. The reactive power algorithm 58 calculates the power grid D-axis voltage, $V_{grid\_d}$, according to:

$$V_{grip\_d} = V_{grid\_rms} \cdot \frac{\sqrt{2}}{\sqrt{3}} \cdot kref, \qquad [\text{Eqn. 2}]$$

where kref is a reference constant set to a specific value based on representations of the various D-axis and Q-axis currents and voltages used in the reactive power algorithm 58 and the active power algorithm 60. In one embodiment, the reference constant, kref, is set to 1.5 for calculating three-phase representations of the various D-axis and Q-axis voltages and currents. In other embodiments, the various D-axis and Q-axis voltages and currents are calculated using other representations. As one non-limiting example, the reference constant, kref, is 1 instead of 1.5.

At STEP 82, the reactive power algorithm 58 calculates a power grid-requested Q-axis current, $I_{grid\_q\_requested}$, according to:

$$I_{grid\_q\_requested} = kref \cdot 1000 \cdot \frac{Q_{cmd}}{-V_{grid\_d}}, \qquad [\text{Eqn. 3}]$$

where the power grid-requested Q-axis current, $I_{grid\_q\_requested}$, represents the Q-axis current that the inverter 18 needs to supply to the power grid 50 with the power grid D-axis voltage, $V_{grid\_d}$, to supply the power grid reactive power command, $Q_{cmd}$, to the power grid 50.

At STEP 84, the reactive power algorithm 58 calculates a filter capacitor Q-axis current, $I_{C\_q}$, according to:

$$I_{C\_q} = \frac{V_{grid\_d}}{X_{C\_q}}, \qquad [\text{Eqn. 4}]$$

where $X_{C\_q}$ is a capacitive reactance of the filter capacitors 33, 35, 37. The filter capacitor Q-axis current, $I_{C\_q}$, represents the Q-axis current flowing into the filter capacitors 33, 35, 37 of the LC filter 31. At STEP 86, the reactive power algorithm 58 calculates a power grid-requested inverter Q-axis current, $I_{L\_q\_requested}$, according to:

$$I_{L\_q\_requested} = I_{grid\_q\_requested} + I_{C\_q} \qquad [\text{Eqn. 5}],$$

where the power grid-requested inverter Q-axis current, $I_{L\_q\_requested}$, represents the current flowing through the inductors 32, 34, 36 corresponding to the total of the power grid-requested Q-axis current, $I_{grid\_q\_requested}$, and the filter capacitor Q-axis current, $I_{C\_q}$.

At STEP 88, the reactive power algorithm 58 calculates a maximum inverter peak AC voltage, $V_{invpeak\_max}$, of the inverter 18 according to:

$$V_{invpeak\_max} = V_{inv\_d\_max} = ksf \cdot kpwm \cdot \frac{V_{dc}}{2}, \qquad [\text{Eqn. 6}]$$

where ksf is a safety factor applied to give a safety margin on the maximum inverter peak AC voltage, $V_{invpeak\_max}$, to ensure no damage is done to the inverter 18 and kpwm represents a percentage increase in voltage achieved due to 3rd harmonic injection that will vary based on what pulse width modulation (PWM) technique is used to control the inverter 18. For example, kpwm may be set to 1.15 for one PWM technique to represent a 15% increase in voltage due to 3rd harmonic injection. The maximum inverter peak AC voltage, $V_{invpeak\_max}$, is a theoretical maximum peak voltage on the AC-side of the inverter 18 based on the PV array DC voltage, $V_{dc}$, on the DC-side of the inverter 18. Exemplary, non-limiting values of the safety factor, ksf, may include 0.99 (99% of the maximum inverter peak AC voltage, $V_{invpeak\_max}$) and 0.98 (98% of the maximum inverter peak AC voltage, $V_{invpeak\_max}$).

At STEP 90, the reactive power algorithm 58 calculates a minimum allowable inverter Q-axis current, $I_{L\_q\_allowed}$, according to:

$$I_{L\_q\_allowed} = \frac{-(kref \cdot V_{inv\_d\_max} - V_{grid\_d})}{(\omega \cdot L)}, \quad [\text{Eqn. 7}]$$

where ω is an angular frequency of the PV system 10. The minimum allowable inverter Q-axis current, $I_{L\_q\_allowed}$, is the Q-axis current that would flow through the inductors 32, 34, 36 if the inverter 18 outputs the maximum inverter peak AC voltage, $V_{inv\_d\_max}$.

At STEP 92, the reactive power algorithm 58 calculates an inverter Q-axis current, $I_{L\_q\_delivered}$, for delivery by the inverter 18 according to:

if($I_{L\_q\_requested} < I_{L\_q\_allowed}$)

$I_{L\_q\_delivered} = I_{L\_q\_allowed}$

Else $I_{L\_q\_delivered} = I_{L\_q\_requested}$ [Eqn. 8], where $I_{L\_q\_delivered}$ is the current the inverter 18 should deliver to the inductors 32, 34, 36. As shown by Eqn. 8, the reactive power algorithm 58 will not allow the inverter Q-axis current, $I_{L\_q\_delivered}$, to be set to a value less than the value of the minimum allowable inverter Q-axis current, $I_{L\_q\_allowed}$, so the inverter 18 is not damaged. At STEP 94, the reactive power algorithm 58 calculates a raw value for a power grid Q-axis current, $I_{grid\_q\_delivered\_raw}$, for delivery to the power grid 50 by the inverter 18 corresponding to the inverter Q-axis current, $I_{L\_q\_delivered}$, according to:

$I_{grid\_q\_delivered\_raw} = I_{L\_q\_delivered} - I_{C\_q}$ [Eqn. 9], where $I_{grid\_q\_delivered\_raw}$ is the value of the Q-axis current the power grid 50 would receive if inverter 18 outputs the inverter Q-axis current, $I_{L\_q\_delivered}$.

At STEP 96, the reactive power algorithm 58 calculates a power grid Q-axis current, $I_{grid\_q\_delivered}$, for delivery to the power grid 50 by the inverter 18 according to:

if($I_{grid\_q\_delivered\_raw} < -kref \cdot 1.414 \cdot I_{ac\_lim}$)

$I_{grid\_q\_delivered} = -kref \cdot 1.414 \cdot I_{ac\_lim}$ else if($I_{grid\_q\_delivered\_raw} > kref \cdot 1.414 \cdot I_{ac\_lim}$)

$I_{grid\_q\_delivered} = kref \cdot 1.414 \cdot I_{ac\_lim}$ $I_{grid\_q\_delivered} = I_{grid\_q\_delivered\_raw}$ [Eqn. 10], where $I_{ac\_lim}$ is an AC-side rms current limit of the inverter 18 and $I_{grid\_q\_delivered}$ is the Q-axis current that should be delivered to the power grid 50. As shown by Eqn. 10, the reactive power algorithm 58 will not allow the power grid Q-axis current, $I_{grid\_q\_delivered}$, to be set to a value beyond the negative or positive value of the AC-side rms current limit, $I_{ac\_lim}$, of the inverter 18 so that the inverter 18 operates within its SOA. Therefore, the power grid Q-axis current, $I_{grid\_q\_delivered}$, is the maximum possible Q-axis current the inverter 18 can output while operating within its SOA and meeting the constraints of the PV array DC voltage, $V_{dc}$, and the power grid rms voltage, $V_{grid\_rms}$.

At STEP 98, the reactive power algorithm 58 calculates the reactive power, Q, for delivery to the power grid 50 by the inverter 18 according to:

$$Q = -V_{grid\_d} \cdot I_{grid\_q\_delivered} \cdot \frac{1}{kref}. \quad [\text{Eqn. 11}]$$

Since the reactive power algorithm 58 uses the power grid Q-axis current, $I_{grid\_q\_delivered}$, to calculate the reactive power, Q, the reactive power, Q, is the maximum possible reactive power the inverter 18 can output while operating within its SOA and meeting the constraints of the PV array DC voltage, $V_{dc}$, and the power grid rms voltage, $V_{grid\_rms}$. At STEP 100, the reactive power algorithm 58 calculates Q-axis reference current, $I_{q\_ref}$, according to:

$$I_{q\_ref} = \frac{Q}{Q_{pu} \cdot 1000}, \quad [\text{Eqn. 12}]$$

where $Q_{pu}$ is a preset reactive power constant corresponding to characteristics of the inverter 18 used to calculate Q-axis reference current, $I_{q\_ref}$, from reactive power, Q.

STEPS 102 and 104 of the reactive power algorithm 58 are performed simultaneously. At STEP 102, the reactive power algorithm 58 outputs the power grid D-axis voltage, $V_{grid\_d}$, the maximum inverter peak AC voltage, $V_{invpeak\_max}$, and the power grid Q-axis current, $I_{grid\_q\_delivered}$, for delivery to the power grid 50 by the inverter 18 to the active power algorithm 60. In another embodiment, the reactive power algorithm 58 outputs the power grid D-axis voltage, $V_{grid\_d}$, the maximum inverter peak AC voltage, $V_{invpeak\_max}$, and the power grid Q-axis current, $I_{grid\_q\_delivered}$, to the active power algorithm 60 as each is calculated by the reactive power algorithm 58. At STEP 104, the reactive power algorithm 58 outputs the inverter Q-axis reference current, $I_{q\_ref}$, to the inverter current control block 56, which interprets the Q-axis reference current, $I_{q\_ref}$, and outputs signals to switches 20, 22, 24, 26, 28, 30 of the inverter 18 so that the inverter 18 outputs the power grid Q-axis current $I_{grid\_q\_delivered}$.

Figure 3:
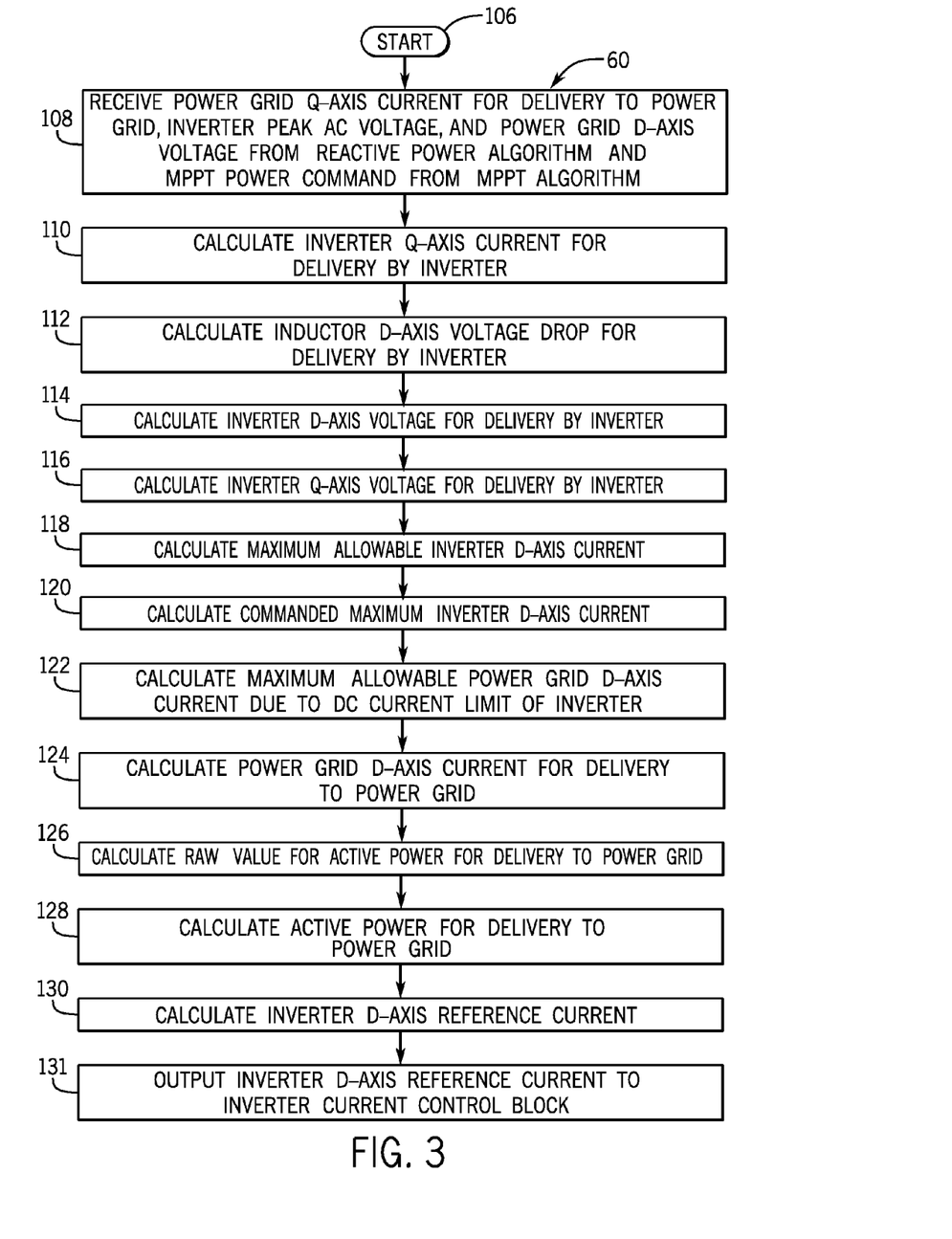
FIG. 3 is a flow chart setting forth exemplary steps of the active power algorithm of FIG. 1, according to an embodiment of the invention.

Referring now to FIG. 3, the active power algorithm 60 of FIG. 1 for calculating the inverter D-axis reference current, $I_{d\_ref}$, is set forth, according to an embodiment of the invention. The reactive power algorithm 58 starts at STEP 106 when the controller 52 is powered on. At STEP 108, the active power algorithm 60 receives the power grid D-axis voltage, $V_{grid\_d}$, the maximum inverter peak AC voltage, $V_{invpeak\_max}$, and the power grid Q-axis current, $I_{grid\_q\_delivered}$, from the reactive power algorithm 58. At STEP 110, the active power algorithm 60 calculates a new value for the inverter Q-axis current, $I_{L\_q\_delivered}$, for delivery by the inverter 18 according to:

$I_{L\_q\_delivered} = I_{grid\_q\_delivered} + I_{C\_q}$ [Eqn. 13].

Although the inverter Q-axis current, $I_{L\_q\_delivered}$, has already been calculated in the reactive power algorithm 58 in Eqn. 8, the inverter Q-axis current, $I_{L\_q\_delivered}$, through the inductors 32, 34, 36 is recalculated in the active power algorithm 60 in Eqn. 13 using the power grid Q-axis current, $I_{grid\_q\_delivered}$, as opposed to the raw value of the power grid Q-axis current, $I_{grid\_q\_delivered\_raw}$, in Eqn. 9. In this manner, Eqn. 13 accounts for the situation when the power grid Q-axis current, $I_{grid\_q\_delivered}$, is set to a value other than the raw value of the power grid Q-axis current, $I_{grid\_q\_delivered\_raw}$, in Eqn. 10 because of the AC-side rms current limit, $I_{ac\_lim}$.

At STEP 112, the active power algorithm 60 calculates an inductor D-axis voltage drop, $V_{L\_d}$, across inductors 32, 34, 36 corresponding to the inverter Q-axis current, $I_{L\_q\_delivered}$, according to:

$$V_{L\_d} = -I_{L\_q\_delivered} \cdot \omega \cdot L \qquad \text{[Eqn. 14]}.$$

At STEP 114, the active power algorithm 60 calculates an inverter D-axis voltage, $V_{inv\_d}$, for delivery by the inverter 18 according to:

$$V_{inv\_d} = V_{grid\_d} + V_{L\_d} \qquad \text{[Eqn. 15]},$$

where the inverter D-axis voltage, $V_{inv\_d}$, represents the voltage output by the inverter 18 corresponding to the total of the power grid D-axis voltage, $V_{grid\_d}$, and the inductor D-axis voltage drop, $V_{L\_d}$. The inverter D-axis voltage, $V_{inv\_d}$, is the D-axis voltage the inverter 18 needs to output to supply the power grid reactive power command, $Q_{cmd}$. At STEP 116, the active power algorithm 60 calculates an inverter Q-axis voltage, $V_{inv\_q}$, for delivery by the inverter 18 corresponding to the inverter peak AC voltage, $V_{invpeak\_max}$, and the inverter D-axis voltage, $V_{inv\_d}$, according to:

$$V_{inv\_q} = \sqrt{((kref \cdot V_{invpeak\_max})^2 - V_{inv\_d}^2)} \qquad \text{[Eqn. 16]}.$$

At STEP 118, the active power algorithm 60 calculates a maximum allowable inverter D-axis current, $I_{L\_d\_max}$, corresponding to the inverter Q-axis voltage, $V_{inv\_q}$, according to:

$$I_{L\_d\_max} = \frac{V_{inv\_q}}{(\omega \cdot L)}. \qquad \text{[Eqn. 17]}$$

The maximum allowable inverter D-axis current, $I_{L\_d\_max}$, represents a maximum allowed active power the inverter 18 can output and remain in its SOA. At STEP 120, the active power algorithm 60 calculates a commanded maximum inverter D-axis current, $I_{L\_d\_cmd\_max}$, according to:

$$I_{L\_d\_cmd\_max} = \min(\sqrt{((kref \cdot 1.414 \cdot I_{ac\_lim})^2 - I_{grid\_q\_delivered}^2)}, I_{L\_d\_max}) \qquad \text{[Eqn. 18]}.$$

As shown in Eqn. 18, the active power algorithm 60 will not allow the commanded maximum inverter current, $I_{L\_d\_cmd\_max}$, to be set to a value beyond the AC-side rms current limit, $I_{ac\_lim}$, of the inverter 18 so that the inverter 18 operates within its SOA.

At STEP 122, the active power algorithm 60 calculates a maximum allowable power grid D-axis current, $I_{grid\_d\_allowed}$, due to a DC-side current limit of the inverter 18 according to:

$$I_{grid\_d\_allowed} = (\eta \cdot V_{dc} \cdot I_{dc\_lim}) \cdot \frac{kref}{V_{grid\_d}}, \qquad \text{[Eqn. 19]}$$

where η is the power efficiency of the inverter 18. At STEP 124, the active power algorithm 60 calculates a power grid D-axis current, $I_{grid\_d\_delivered}$, for delivery to the power grid 50 by the inverter 18 according to:

$$I_{grid\_d\_delivered} = \min(I_{L\_d\_cmd\_max}, I_{grid\_q\_allowed}) \qquad \text{[Eqn. 20]}.$$

where $I_{grid\_d\_delivered}$ is the D-axis current that should be delivered to the power grid 50. As shown in Eqns. 19 and 20, the active power algorithm 60 will not allow the power grid D-axis current, $I_{grid\_d\_delivered}$, to be set to a value beyond the DC-side current limit of the inverter 18 so that the inverter 18 operates within its SOA. Therefore, the power grid D-axis current, $I_{grid\_d\_delivered}$, is the maximum possible D-axis current the inverter 18 can output while operating within its SOA and meeting the constraints of the PV array DC voltage, $V_{dc}$, and the power grid rms voltage, $V_{grid\_rms}$.

At STEP 126, the active power algorithm 60 calculates a raw value of the active power, P, for delivery to the power grid 50 by the inverter 18 according to:

$$P_{raw} = V_{grid\_d} \cdot I_{grid\_d\_delivered} \cdot \frac{1}{kref} \qquad \text{[Eqn. 21]}$$

Because the active power algorithm 60 uses the power grid D-axis current, $I_{grid\_d\_delivered}$, to calculate the raw value of the active power, $P_{raw}$, the raw value of the active power, $P_{raw}$, is the maximum possible active power the inverter 18 can output while operating within its SOA and meeting the constraints of the PV array DC voltage, $V_{dc}$, and the power grid rms voltage, $V_{grid\_rms}$. At STEP 128, the active power algorithm 60 calculates the active power, P, for delivery to the power grid 50 according to:

$$P = \min(P_{raw}, P_{cmd}) \qquad \text{[Eqn. 22]}.$$

Therefore, if the raw value of the active power, $P_{raw}$, is less than the MPPT active power command, $P_{cmd}$, the active power, P, is limited by the SOA of the inverter 18. However, if the maximum possible active power, $P_{raw}$, allowed by the SOA of the inverter 18 is greater than the MPPT active power command, $P_{cmd}$, the active power, P, is limited to the MPPT active power command, $P_{cmd}$.

At STEP 130, the active power algorithm 60 calculates D-axis reference current, $I_{d\_ref}$, according to:

$$I_{d\_ref} = \frac{P}{P_{pu} \cdot 1000}, \qquad \text{[Eqn. 23]}$$

where $P_{pu}$ is a preset active power constant corresponding to characteristics of the inverter 18 used to calculate D-axis reference current, $I_{d\_ref}$, from the active power, P. At STEP 131, the active power algorithm 60 outputs the inverter D-axis reference current, $I_{d\_ref}$, to the inverter current control block 56, which interprets the D-axis reference current, $I_{d\_ref}$, and outputs signals to switches 20, 22, 24, 26, 28, 30 of the inverter 18 so that the inverter 18 outputs the power grid D-axis current, $I_{grid\_d\_delivered}$.

Referring now to FIGS. 1-3, because the active power algorithm 60 receives inputs from the reactive power algorithm 58 to function, the reactive power algorithm 58 is a priority over the active power algorithm 60. In other words, the inverter 18 prioritizes delivery of the reactive power to the power grid 50 over the active power. In this manner, the power grid reactive power command, $Q_{cmd}$, will always be met by the inverter 18 and the inverter 18 can supply active power to the power grid 50, even when the PV array DC voltage, $V_{dc}$, drops to level where the inverter 18 can no longer supply power according to the MPPT active power command, $P_{cmd}$. However, when the power grid reactive power command, $Q_{cmd}$, is set to zero, the inverter 18 operates with no priority to deliver the reactive power, Q, and prioritizes delivery of the active power, P.

Figure 4:
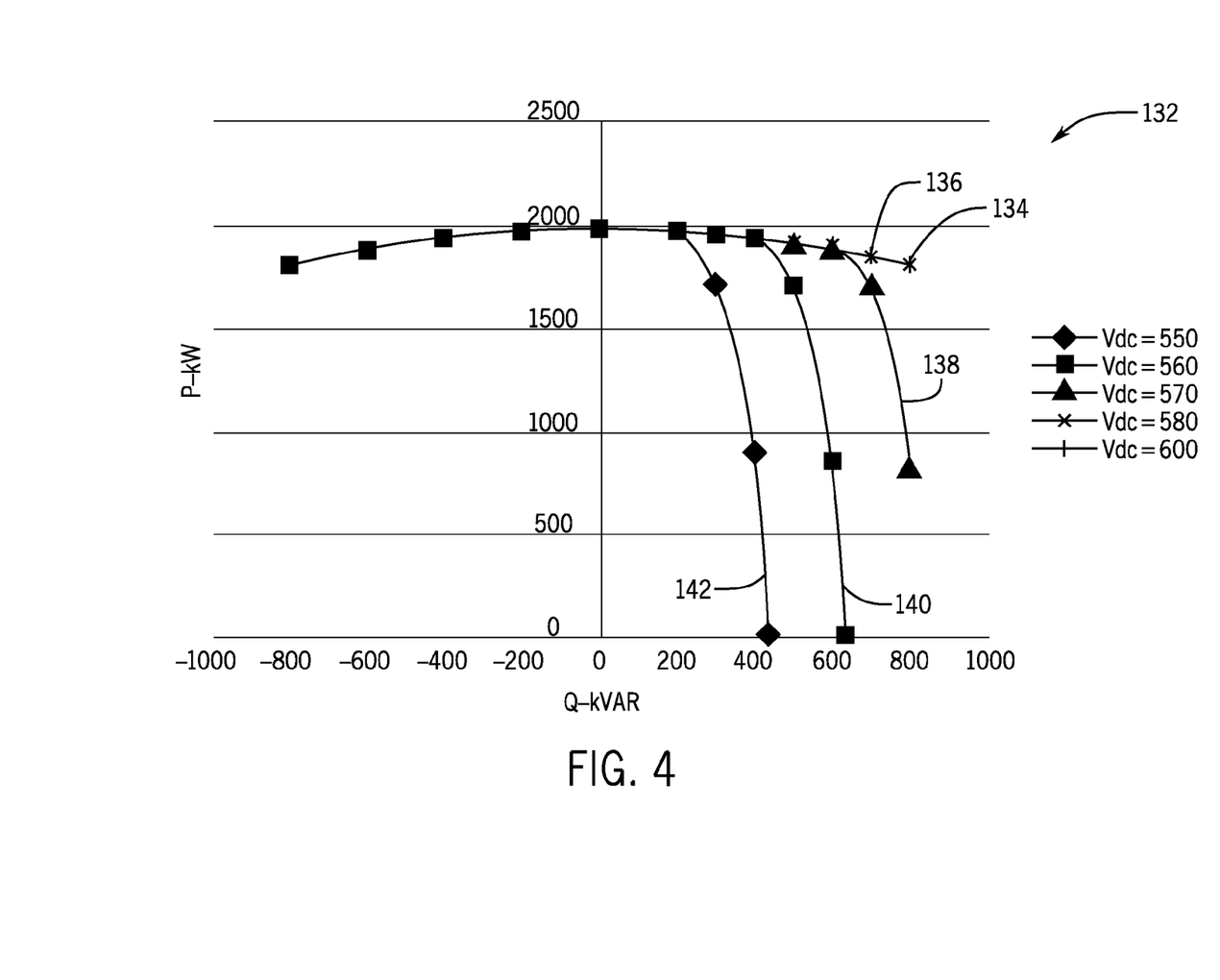
FIG. 4 is a graph illustrating examples of the active and reactive power achievable in the PV system of FIG. 1, according to an embodiment of the invention.

Referring now to FIG. 4, an exemplary graph 132 illustrates examples of the active and reactive power achievable in the PV system 10, according to an embodiment of the invention. Graph 132 illustrates a series of five simulations run in the PV system 10: a first simulation 134, a second simulation 136, a third simulation 138, a fourth simulation 140, and a fifth simulation 142. In each simulation 134, 136, 138, 140, 142, the power grid rms voltage, $V_{grid\_rms}$, is 384 V line-to-line, the DC-side current limit of the inverter 18 is 3100 amperes (A), and the AC-side current limit of the inverter 18 is 2970 A. Each simulation 134, 136, 138, 140, 142 shows the amount of active power, P, in kilowatts (kW) that the inverter 18 can deliver to the power grid 50 for different levels of reactive power, Q, delivered to the power grid 50 by the inverter 18. The reactive power is displayed in kilovolt-amperes reactive (kVAR) and is varied from −800 kVAR to 800 kVAR. Each simulation 134, 136, 138, 140, 142 corresponds to a different PV array DC voltage, $V_{dc}$.

In the first simulation 134, the PV array DC voltage is 600 V. As shown, the inverter 18 is able to supply a large amount of the active power over the entire range of the reactive power. The same can be said of the inverter 18 in the second simulation 136, in which the PV array DC voltage is 580 V. However, in the third, fourth, and fifth simulations 138, 140, 142, in which the PV array DC voltage is 570 V, 560 V, and 550 V, respectively, the inverter 18 is not able to supply as much active power over the entire range of the reactive power.

In the third simulation 138, the inverter 18 cannot supply as much active power after the reactive power increases to a level above 600 kVAR. Because of the inverter Q-axis and D-axis reference currents $I_{q\_ref}$, $I_{d\_ref}$ received from the reactive and active power algorithms 58, 60 of the ISOA control block 54, the inverter current control block 56 is able to curtail the amount active power the inverter 18 outputs to the power grid 50. The inverter current control block controls the inverter 18 to output as much active power as possible while still operating within the SOA of the inverter 18 and meeting the constraints of the power grid rms voltage, $V_{grid\_rms}$, and the PV array DC voltage, $V_{dc}$. The same can be said of the inverter 18 in the fourth and fifth simulations 140, 142, except that the active power, P, the inverter 18 is able to supply to the power grid 50 starts to decrease above 400 kVAR and 200 kVAR, respectively, because of the lower PV array DC voltages of 560 V and 550 V, respectively. However, when the power grid reactive power command, $Q_{cmd}$, becomes too high (above 600 kVAR in the case of the fourth simulation 140 and above 400 kVAR in the case of the fifth simulation 142), the inverter current control block 56 must also curtail the reactive power. When the reactive power is curtailed, the active power is zero.

The controller 52 is able to operate under both capacitive reactive power conditions (when the reactive power is negative) and inductive reactive power conditions (when the reactive power is positive). However, under capacitive reactive power conditions, the voltage output by inverter 18 is less than the power grid rms voltage, $V_{grid\_rms}$. Therefore, a low PV array DC bus voltage, $V_{dc}$, does not constrain the operation of the inverter 18 under capacitive reactive power conditions, and the maximum reactive power is constrained only in the case of the inductive reactive power conditions.

Figure 5:
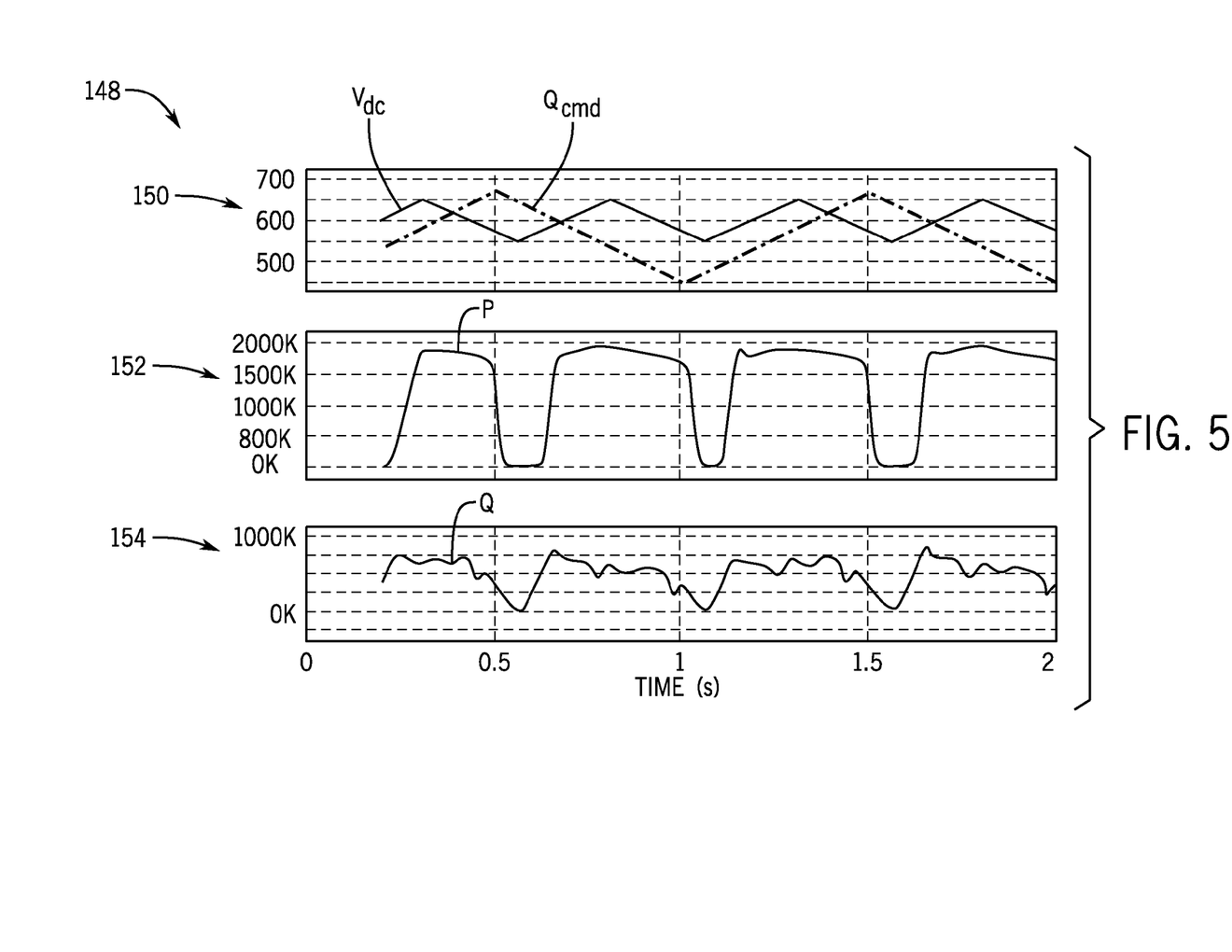
FIG. 5 is a series of graphs illustrating a simulation of the PV system of FIG. 1, according to an embodiment of the invention.

Referring now to FIG. 5, results of an example simulation 148 run on the PV system 10 are shown, according to an embodiment of the invention. The results of the simulation 148 are illustrated by a first graph 150, a second graph 152, and a third graph 154. The first graph 150 illustrates the parameters of the simulation 148. In the simulation 148, the PV array DC voltage, $V_{dc}$, is varied from 550 V to 650 V at a frequency of 2 hertz (Hz). The power grid reactive power command, $Q_{cmd}$, is varied from 450 kVAR to 675 kVAR at a frequency of 1 Hz. The second graph 152 illustrates the active power, P, for delivery to the power grid 50 by the inverter 18. The third graph 154 illustrates the reactive power, Q, for delivery to the power grid 50 by the inverter 18. The power grid rms voltage, $V_{grid\_rms}$, is set at 384 V line-to-line.

As seen in the simulation 148, the active power is curtailed whenever there is not enough of the PV array DC voltage, $V_{dc}$, to supply the active power and meet the power grid reactive power command, $Q_{cmd}$. The active power is curtailed around 0.5 seconds, 1 second, and 1.5 seconds when the PV array DC voltage, $V_{dc}$, is at 575 V. The controller 52 controls the inverter 18 to output the maximum amount of active power without going outside of the SOA of the inverter 18 and meeting the constraints of the PV array DC voltage, $V_{dc}$, and the power grid rms voltage, $V_{grid\_rms}$. When the reactive power for delivery to the power grid 50 by the inverter 18 is also curtailed shortly after 0.5 seconds, 1 second, and 1.5 seconds in the third graph 154, the active power drops to 0 V.

Figure 6:
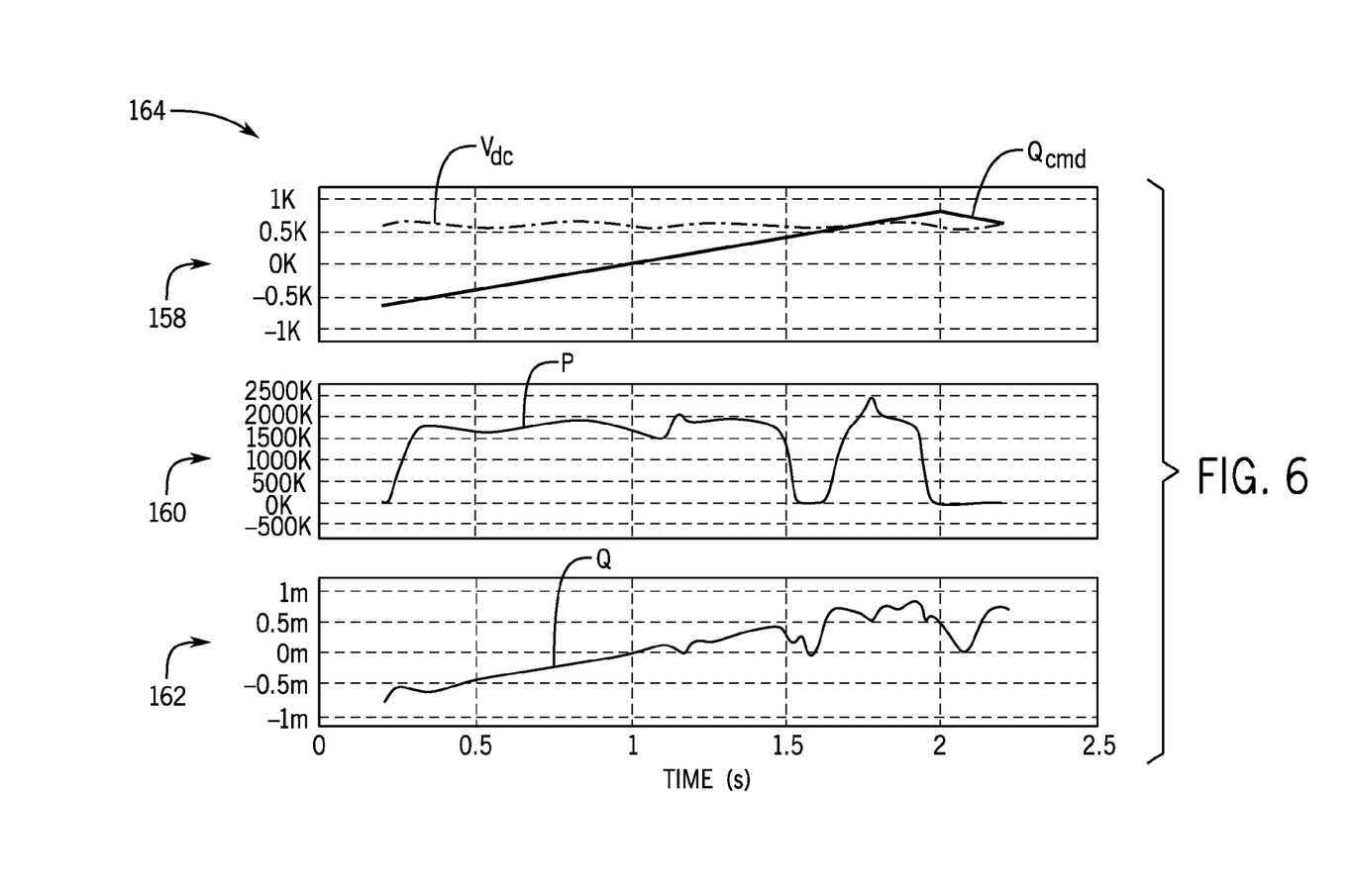
FIG. 6 is a series of graphs illustrating an additional simulation of the PV system of FIG. 1, according to an embodiment of the invention.

Referring now to FIG. 6, results of another example simulation 156 run on the PV system 10 are shown, according to an embodiment of the invention. The results of the simulation 156 are illustrated by a first graph 158, a second graph 160, and a third graph 162. The first graph 158 illustrates the parameters of the simulation 156. In the simulation 156, the PV array DC voltage, $V_{dc}$, is varied from 550 V to 650 V at a frequency of 2 Hz. The power grid reactive power command, $Q_{cmd}$, is varied from −800 kVAR to 800 kVAR at a frequency of 0.25 Hz. The second graph 160 illustrates the active power, P, for delivery to the power grid 50 by the inverter 18. The third graph 162 illustrates the reactive power, Q, delivered to the power grid 50 by the inverter 18. The power grid rms voltage, $V_{grid\_rms}$, was set to 384 V line-to-line.

As seen in the first, second, and third graphs 158, 160, 162, when the power grid reactive power command, $Q_{cmd}$, is a negative value, almost full active power is supplied by the inverter 18. The active power is only curtailed due to the DC-side current limit, $I_{dc\_limit}$, of the inverter 18 when the power grid reactive power command, $Q_{cmd}$, is negative. However, the active power is curtailed when the power grid reactive power command, $Q_{cmd}$, is positive and there is not enough of the PV array DC voltage, $V_{dc}$, to supply the active power and meet the power grid reactive power command, $Q_{cmd}$. The controller 52 controls the inverter 18 to output the maximum amount of active power without going outside of the SOA of the inverter 18 and meeting the constraints of the PV array DC voltage, $V_{dc}$, and the power grid rms voltage, $V_{grid\_rms}$. When the reactive power for delivery to the power grid 50 by the inverter 18 is also curtailed shortly after 0.5 seconds, 1 second, and 1.5 seconds in the third graph 162, the active power drops to 0 V.

Figure 7:
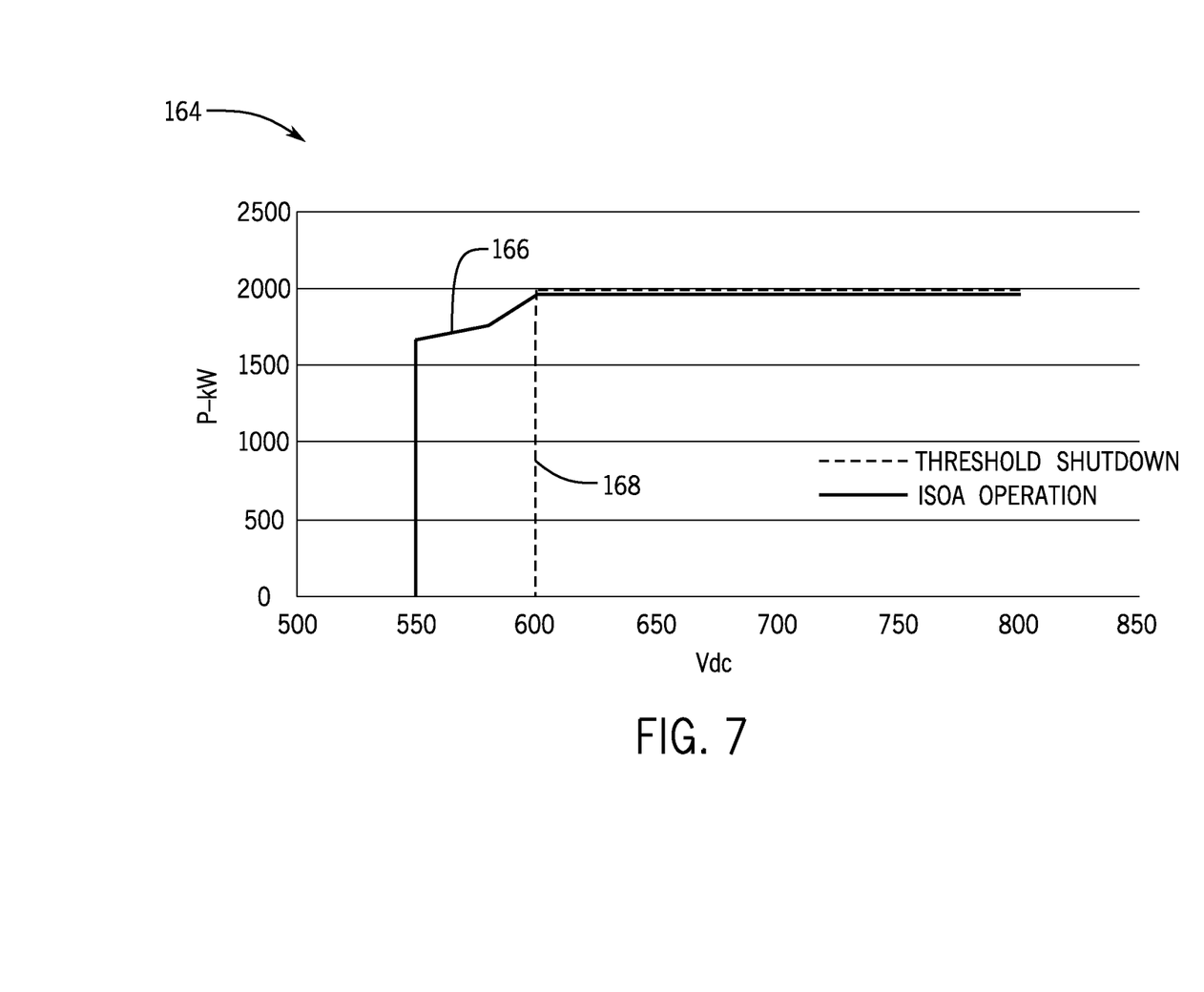
FIG. 7 is a graph illustrating an example of the active power achievable in the PV system of FIG. 1 as compared to prior art PV systems.

Referring now to FIG. 7, an exemplary graph 164 illustrates an example of the active power, P, for delivery to power grid 50 by the inverter 18 achievable in the PV system 10 versus the active power achievable in prior art PV systems. The graph 164 illustrates the level of active power in kW for delivery to the power grid 50 for a PV array DC voltage, $V_{dc}$. In the graph 164, the PV array DC voltage decreases to a level that is too low for providing full active power at 600 V. An ISOA operational curve 166 for the PV system 10 illustrates how the controller 52 is able to control the inverter 18 to supply some active power to the power grid, even after there is not enough PV array DC voltage to supply full active power. As shown, the active power begins to drop at a PV array DC voltage of 600 V and drops to a value of 0 V at a PV array DC voltage of 550 V when the reactive power, Q, is also curtailed.

In contrast with the ISOA operation curve 166, a threshold operational curve 168 for a prior art PV system illustrates how the controller shuts down the inverter at a PV array DC voltage, $V_{dc}$, of 600 V to prevent the inverter from exceeding its DC-side and AC-side current limits. While both the prior art inverter and the inverter 18 are both prevented from exceeding their DC-side and AC-side current limits, the inverter 18 is able to supply active power, P, at a minimum PV array DC voltage that is 50 V less than the minimum PV array DC voltage of the prior art inverter. Therefore, controller 52 provides the advantage of allowing the inverter 18 of the PV system 10 to supply active power to the power grid 50 for a longer period of time, thereby maximizing the amount of active power supplied to the power grid 50 over the lifetime of the PV system 10.

Beneficially, embodiments of the invention thus provide a system and method of controlling an inverter to supply power to a power grid under low-DC voltage input conditions. An inverter controller controls the inverter to operate within a SOA defined by the hardware limitations of the inverter while still meeting the constraints of a power grid voltage and a power grid reactive power setting or command. The inverter controller includes an ISOA control block including a reactive power algorithm for calculating the maximum Q-axis current (the maximum reactive power) the inverter can supply to the power grid and an active power algorithm for calculating the maximum D-axis current (the maximum active power) the inverter can supply to the power grid. An inverter current control block receives commands corresponding to the maximum Q-axis and D-axis currents and controls the inverter switches to output the maximum Q-axis and D-axis currents, even under low-DC voltage input conditions. Thus the inverter controller enables the inverter to provide the maximum amount of active power to the power grid under all conditions.

According to one embodiment of the present invention, a system for controlling an inverter to supply power from a DC power source to a power grid includes a sensor system coupled to the power grid, a voltage sensor coupled to an output of the DC power source, and a controller coupled to the sensor system and the voltage sensor to receive signals therefrom. The controller is programmed to calculate a maximum reactive power that the inverter can deliver to the power grid according to a reactive power algorithm and based on a reactive power command received from a utility, a power grid voltage received from the sensor system, and a voltage of the DC power source received from the voltage sensor. The controller is also programmed to calculate a maximum active power that the inverter can deliver to the power grid according to an active power algorithm and based on the maximum reactive power. The controller is further programmed to control the inverter to deliver to the power grid the maximum reactive power and an active power equal to the smaller of the maximum active power and a maximum power point tracking active power command.

According to another embodiment of the present invention, a method for controlling an inverter includes receiving a reactive power command from a utility and sensing a voltage of the power grid and a direct current (DC) voltage of a power source providing power to the power grid. The method also includes calculating in a reactive power algorithm a maximum reactive power the inverter can deliver to the power grid based on the reactive power command, the voltage of the power grid, the DC voltage of the power source. The method further includes calculating in an active power algorithm a maximum active power the inverter can deliver to the power grid based on the reactive power the inverter can deliver to the power grid. In addition, the method includes outputting the maximum reactive power to an inverter current control block and outputting control signals from the inverter current control block to switches of the inverter to control the inverter to output to the power grid the maximum reactive power.

According to yet another embodiment of the present invention, a photovoltaic (PV) system includes a PV array, an inverter coupled to the PV array for converting a direct current (DC) voltage of the PV array to an alternating current (AC) voltage for delivery to a power grid, a power grid sensor system for monitoring a voltage of the power grid, and a PV sensor for monitoring the DC voltage of the PV array. The PV system also includes a controller programmed to calculate a maximum reactive power the inverter can deliver to the power grid based on a reactive power command received from a utility, the voltage of the power grid, the DC voltage of the PV array, and an AC-side current limit of the inverter. The controller is further programmed to calculate a maximum active power the inverter can deliver to the power grid based on the maximum Q-axis current and the AC-side current limit of the inverter. The controller is additionally programmed to control the inverter to output to the power grid the maximum reactive power and an active power equal to the lesser of the maximum active power and a maximum power point tracking active power command.

The present invention has been described in terms of the preferred embodiment, and it is recognized that equivalents, alternatives, and modifications, aside from those expressly stated, are possible and within the scope of the appending claims.

What is claimed is:

1. A system for controlling an inverter to supply power from a DC power source to a power grid, the system comprising:

a sensor system coupled to the power grid;

a voltage sensor coupled to an output of the DC power source; and a controller coupled to the sensor system and the voltage sensor to receive signals therefrom, the controller programmed to:

calculate a maximum reactive power that the inverter can deliver to the power grid according to a reactive power algorithm and based on a reactive power command received from a utility, a power grid voltage received from the sensor system, and a voltage of the DC power source received from the voltage sensor;

calculate a maximum active power that the inverter can deliver to the power grid according to an active power algorithm and based on the maximum reactive power; and control the inverter to deliver to the power grid the maximum reactive power and an active power equal to the smaller of the maximum active power and a maximum power point tracking active power command.

2. The control system of claim 1 wherein the reactive power algorithm calculates the maximum reactive power by:
calculating a power grid-requested inverter Q-axis current based on the reactive power command and the power grid voltage;
calculating a minimum allowable inverter Q-axis current based on the voltage of the power grid and a maximum peak AC voltage of the inverter;
calculating an inverter Q-axis current for delivery by the inverter based on the minimum allowable inverter Q-axis current and the power grid-requested inverter Q-axis current;
calculating a maximum power grid Q-axis current for delivery to the power grid based on the inverter Q-axis current for delivery to the power grid and an AC-side current limit of the inverter; and
calculating the maximum reactive power based on the maximum power grid Q-axis current.

3. The control system of claim 2 wherein the reactive power algorithm is configured to:
calculate a raw value for the maximum power grid Q-axis current using the inverter Q-axis current for delivery to the power grid;
set the maximum power grid Q-axis current equal to $-kref \cdot 1.414 \cdot I_{ac\_lim}$, if the raw value for the maximum Q-axis current is less than $-kref \cdot 1.414 \cdot I_{ac\_lim}$, where kref is a reference constant corresponding to the representation of D-axis and Q-axis currents and voltages and $I_{ac\_lim}$ is the AC-side current limit of the inverter;
set the maximum power grid Q-axis current to $kref \cdot 1.414 \cdot I_{ac\_lim}$ if the raw value for the maximum Q-axis current is greater than $kref \cdot 1.414 \cdot I_{ac\_lim}$; and
set the maximum power grid Q-axis current to the raw value for the maximum Q-axis current otherwise.

4. The control system of claim 2 wherein the reactive power algorithm is configured to:
set the inverter Q-axis current for delivery to the power grid equal to the minimum allowable inverter Q-axis current if the power grid-requested inverter Q-axis current is less than the minimum allowable inverter Q-axis current; and
set the inverter Q-axis current for delivery to the power grid equal to the power grid-requested inverter Q-axis current requested otherwise.

5. The control system of claim 2 wherein the reactive power algorithm calculates the maximum peak AC voltage of the inverter using a safety factor.

6. The control system of claim 1 wherein the active power algorithm calculates the maximum active power by:
calculating an inductor D-axis voltage drop corresponding to a maximum power grid Q-axis current the inverter can deliver to the power grid;
calculating an inverter Q-axis voltage based on the inverter D-axis voltage and a maximum peak AC voltage of the inverter;
calculating a maximum allowable inverter D-axis current based on the inverter Q-axis voltage;
calculating a commanded maximum inverter D-axis current based on the maximum allowable inverter D-axis current, the maximum power grid Q-axis current the inverter can deliver to the power grid, and an AC-side current limit of the inverter;
calculating a maximum allowable power grid D-axis current for delivery to the power grid based on the voltage of the power grid and a DC-side current limit of the inverter;
calculating a maximum power grid D-axis current the inverter can deliver to the power grid based on the commanded maximum inverter D-axis current and the maximum allowable power grid D-axis current; and
calculating the maximum active power based on the maximum power grid D-axis current.

7. The control system of claim 6 wherein the active power algorithm sets the maximum power grid D-axis current equal to the lesser of the commanded maximum inverter D-axis current and the maximum allowable power grid D-axis current.

8. The control system of claim 6 wherein the active power algorithm calculates the command maximum inverter D-axis current according to:

$$I_{L\_d\_cmd\_max} = \min(\sqrt{((kref \cdot 1.414 \cdot I_{ac\_lim})^2 - I_{grid\_q\_delivered}^2)}, I_{L\_d\_max}),$$

wherein kref is a reference constant corresponding to the representation of D-axis and Q-axis currents and voltages, $I_{ac\_lim}$ is the AC current limit of the inverter, $I_{grid\_q\_delivered}$ delivered is the maximum power grid Q-axis current the inverter can deliver to the power grid, and $I_{L\_d\_max}$ is the maximum allowable power grid D-axis current for delivery to the grid.

9. A method for controlling an inverter comprising:
receiving a reactive power command from a utility;
sensing a voltage of the power grid and a direct current (DC) voltage of a power source providing power to the power grid;
calculating in a reactive power algorithm a maximum reactive power the inverter can deliver to the power grid based on the reactive power command, the voltage of the power grid, and the DC voltage of the power source;
calculating in an active power algorithm a maximum active power the inverter can deliver to the power grid based on the maximum reactive power the inverter can deliver to the power grid;
outputting the maximum reactive power to an inverter current control block; and
outputting control signals from the inverter current control block to switches of the inverter to control the inverter to output to the power grid the maximum reactive power.

10. The method of claim 9 further comprising:
receiving in the active power algorithm a maximum power point tracking active power command for the inverter;
calculating in the active power algorithm an active power for delivery to the power grid based on the maximum active power the inverter can deliver to the power grid and the maximum power point tracking active power command;
outputting the active power for delivery to the power grid to the inverter current control block; and
outputting control signals from the inverter current control block to switches of the inverter to control the inverter to output to the power grid the active power for delivery to the power grid.

11. The method of claim 9 further comprising:
converting the maximum reactive power the inverter can deliver to the power grid to a Q-axis reference current using the reactive power algorithm;
converting the maximum active power the inverter can deliver to the power grid to a D-axis reference current using the active power algorithm;
outputting the Q-axis and D-axis reference currents to the inverter current control block; and
outputting control signals from the inverter current control block to switches of the inverter to control the inverter based on the Q-axis and D-axis reference currents.

12. The method of claim 9 further comprising:
limiting the maximum reactive power the inverter can deliver to the power grid based on an AC-side current limit of the inverter; and
limiting the maximum active power the inverter can deliver to the power grid based on the AC-side current limit of the inverter and a DC-side current limit of the inverter.

13. The method of claim 9 further comprising limiting the maximum reactive power the inverter can deliver to the power grid and the maximum active power the inverter can deliver to the power grid based on a preset safety factor.

14. A photovoltaic (PV) system comprising:
a PV array;
an inverter coupled to the PV array for converting a direct current (DC) voltage of the PV array to an alternating current (AC) voltage for delivery to a power grid;
a power grid sensor system for monitoring a voltage of the power grid;
a PV sensor for monitoring the DC voltage of the PV array; and
a controller programmed to:
calculate a maximum reactive power the inverter can deliver to the power grid based on a reactive power command received from a utility, the voltage of the power grid, the DC voltage of the PV array, and an AC-side current limit of the inverter;
calculate a maximum active power the inverter can deliver to the power grid based on the maximum Q-axis current and the AC-side current limit of the inverter; and
control the inverter to output to the power grid the maximum reactive power and an active power equal to the lesser of the maximum active power and a maximum power point tracking active power command.

15. The PV system of claim 14 wherein the controller is further programmed to calculate the maximum active power based on a DC-side current limit of the inverter.

16. The PV system of claim 14 wherein the controller is further programmed to calculate the maximum reactive power and the maximum active power using three phase representations of D-axis and Q-axis voltages and currents.

17. The PV system of claim 14 wherein the controller is further programmed to control the inverter to curtail the maximum active power when the PV array DC voltage is too low to supply both the maximum reactive power and the maximum active power to the power grid.

18. The PV system of claim 14 wherein the controller is further programmed to:
convert the maximum reactive power to a Q-axis reference current;
convert the maximum active power to a D-axis reference current; and
control the inverter based on the Q-axis reference current and the D-axis reference current.

19. The PV system of claim 14 wherein the controller is further programmed to calculate the maximum reactive power based on a maximum peak AC voltage of the inverter, $V_{invpeak\_max}$, wherein $$V_{invpeak\_max} = ksf \cdot kpwm \cdot \frac{V_{dc}}{2},$$

and
wherein ksf is a safety factor, kpwm is a percentage increase in voltage achieved due to third harmonic injection, and $V_{dc}$ is the DC voltage of the PV array.

20. The PV system of claim 19 wherein the safety factor is equal to a value within a range from 0.980 to 0.999.

* * * * *

UNITED STATES PATENT AND TRADEMARK OFFICE
CERTIFICATE OF CORRECTION

PATENT NO. : 9,948,211 B2
APPLICATION NO. : 15/002556
DATED : April 17, 2018
INVENTOR(S) : Baronian et al.

It is certified that error appears in the above-identified patent and that said Letters Patent is hereby corrected as shown below:

In the Claims

Column 16, Line 27 (Claim 8), delete "delivered is the maximum" and substitute therefore
-- is the maximum --.

Signed and Sealed this
Fifth Day of June, 2018

Andrei Iancu
*Director of the United States Patent and Trademark Office*